(12) United States Patent
Beyer et al.

(10) Patent No.: US 8,654,949 B2
(45) Date of Patent: Feb. 18, 2014

(54) METHODS, SYSTEMS AND COMPUTER PROGRAM PRODUCTS FOR PROVIDING ACCESS TO PERSONAL PROFILES IN COMMUNICATIONS SYSTEMS

(75) Inventors: Loraine Beyer, Hoover, AL (US); Frederick Iffland, Birmingham, AL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1568 days.

(21) Appl. No.: 11/970,127

(22) Filed: Jan. 7, 2008

(65) Prior Publication Data

US 2009/0175426 A1    Jul. 9, 2009

(51) Int. Cl.
*H04M 3/42*    (2006.01)
*H04W 4/00*    (2009.01)

(52) U.S. Cl.
USPC .............. 379/201.02; 379/201.01; 455/414.1; 455/432.3

(58) Field of Classification Search
USPC ........... 379/201.02, 201.01; 455/414.1, 432.3
See application file for complete search history.

(56) References Cited

U.S. PATENT DOCUMENTS

| | | | |
|---|---|---|---|
| 5,329,578 A * | 7/1994 | Brennan et al. | 379/211.03 |
| 6,038,305 A * | 3/2000 | McAllister et al. | 379/201.02 |
| 6,108,540 A * | 8/2000 | Sonti et al. | 455/433 |
| 6,898,273 B2 * | 5/2005 | Ernstrom et al. | 379/202.01 |
| 7,536,184 B2 * | 5/2009 | Poczo | 455/432.3 |
| 7,561,535 B2 * | 7/2009 | Naqvi et al. | 370/260 |
| 7,650,148 B2 * | 1/2010 | Kim et al. | 455/435.1 |
| 7,711,366 B1 * | 5/2010 | O'Neil et al. | 455/438 |
| 7,729,705 B2 * | 6/2010 | Jung et al. | 455/456.1 |
| 7,761,600 B2 * | 7/2010 | Terrill et al. | 709/245 |
| 7,864,936 B2 * | 1/2011 | Naqvi et al. | 379/201.12 |
| 7,873,378 B2 * | 1/2011 | Schliwa-Bertling et al. | 455/519 |
| 7,945,039 B1 * | 5/2011 | Malagon et al. | 379/218.01 |
| 2005/0008136 A1 * | 1/2005 | Dobner et al. | 379/211.02 |
| 2007/0070976 A1 * | 3/2007 | Mussman et al. | 370/351 |

* cited by examiner

*Primary Examiner* — Khai N Nguyen
(74) *Attorney, Agent, or Firm* — Myers Bigel Sibley & Sajovec (57) ABSTRACT

Methods of switching personas associated with an asserted identity by determining a selected persona based on at least one of a sequence of digits entered during initiation of a call are provided. The at least one of the sequence of digits indicates a request for a persona associated with an asserted identity. It is indicated that an original persona associated with the asserted identity should be switched to the selected persona associated with the asserted identity if it is determined that the original persona and the selected persona are different. Related systems and computer program products are provided.

14 Claims, 4 Drawing Sheets

METHODS, SYSTEMS AND COMPUTER PROGRAM PRODUCTS FOR PROVIDING ACCESS TO PERSONAL PROFILES IN COMMUNICATIONS SYSTEMS

BACKGROUND

The present application generally relates to the field of communications and, more particularly, to communications systems and related methods and computer program products.

A wide variety of communications services are available for users. For example, a single user may have a home phone, work phone, and mobile phone. In addition, the user may also use devices such as personal computers (PCs), personal digital assistants (PDAs), and pagers for data communications, such as e-mail and instant messaging.

As communications services develop they offer more functionality and options. As a result, they are becoming more complex to use and manage. For example, a person could use a home phone, cellphone, work phone, e-mail, work e-mail and the like as communications services for different purposes or at different times. In addition, a number of phones and computers could be included in a home or office, thereby providing access to those communications services from different locations in the home or office. Different addresses or identifications could be associated with each of these phones and/or computers or other user input/output devices that may be used in connection with the communications services.

Recently, the concept of a single device capable of handling the functionality of multiple devices, for example, the home phone, the work phone, the mobile phone, the personal computer (PC), personal digital assistant (PDA), pager and the like, has become very popular. Users of the device may subscribe to a service that may allow a subscriber to have several difference personas (profiles). Each of these personas may define a collection of data and/or behavior characteristics that encompass a particular mode of operation chosen and defined by a user. For example, a user may have a "work profile", a "home profile", a "parent profile" and the like. A work profile may include, for example, capabilities and/or data associated with the user's work phone. Such data and/or capabilities may include a call history, an address book, speed dialing codes, a forwarding number, billing arrangements, voicemail and the like. Similar data and/or capabilities may be provided for a user's home profile. The user may have any number of profiles. Thus, the user's single client device may be configured to operate according to one of a plurality of profiles.

SUMMARY

Some embodiments provide methods of switching personas associated with an asserted identity by determining a selected persona based on at least one of a sequence of digits entered during initiation of a call. The at least one of the sequence of digits indicates a request for a persona associated with an asserted identity. It is indicated that an original persona associated with the asserted identity should be switched to the selected persona associated with the asserted identity if it is determined that the original persona and the selected persona are different.

In further embodiments, the original persona may be switched to the selected persona if it is determined that the original and the selected persona are different. A user profile associated with the selected persona may be downloaded and features and services for the call may be set in accordance with the downloaded profile.

In still further embodiments, the sequence of digits entered during initiation of the call may further include an indication of how long the selected persona should be used. The indication may be use the selected persona for the remainder of the present day, use the selected persona for this call only or use the selected persona until further notice.

In some embodiments, an authentication code entered before the sequence of digits may be processed.

In further embodiments, a user associated with the asserted identity has been authenticated to and registered with an internet protocol (IP) multimedia subsystem (IMS) service.

In still further embodiments, the method may be implemented using a keypad of a the POTS telephone. The POTS telephone may include a non-internet protocol (IP) multimedia Subsystem (IMS), non-session initiation protocol (SIP) telephone.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

The accompanying drawings, which form a part of the specification, illustrate some example embodiments. The drawings and description together serve to fully explain the example embodiments.

DETAILED DESCRIPTION OF EMBODIMENTS

While embodiments discussed herein are susceptible to various modifications and alternative forms, specific embodiments thereof are shown by way of example in the drawings and will herein be described in detail. It should be understood, however, that there is no intent to limit embodiments to the particular forms disclosed, but on the contrary, the embodiments discussed herein are to cover all modifications, equivalents, and alternatives falling within the spirit and scope of the present application as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification are taken to specify the presence of stated features, steps, operations, elements, and/or components, but do not preclude the presence or addition of one or more other features, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another.

Example embodiments are described below with reference to block diagrams and/or flowchart illustrations of methods, apparatus (systems and/or devices) and/or computer program products. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the functions/acts specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, example embodiments may be implemented in hardware and/or in software (including firmware, resident software, micro-code, etc.). Furthermore, example embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of data processing systems discussed herein may be written in a high-level programming language, such as Java, AJAX (Asynchronous JavaScript), C, and/or C++, for development convenience. In addition, computer program code for carrying out operations of example embodiments may also be written in other programming languages, such as, but not limited to, interpreted languages. Some modules or routines may be written in assembly language or even micro-code to enhance performance and/or memory usage. However, embodiments are not limited to a particular programming language. It will be further appreciated that the functionality of any or all of the program modules may also be implemented using discrete hardware components, one or more application specific integrated circuits (ASICs), or a programmed digital signal processor or microcontroller.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Individuals may now be faced with situations in which availability of customized sets of capabilities may be desired so that a mobile user can invoke his/her network and/or web services at a specific time and/or in a specific place in a way that is consistent with particular aspects of his/her lifestyle and/or preferences at the time. In some cases, the user may carry multiple devices (such as a work cell phone/PDA, a personal cell phone/PDA, etc.), and/or the user may physically use a device matched to his/her current needs at a particular location (such as, a wire-line family/personal phone at home, a wire-line work-at-home phone, an office phone, etc.). Technology is currently evolving in a direction such that a mobile user may be able to carry one or two powerful devices (such as a dual mode phone/PDA and a laptop, for example) that may potentially satisfy most of his/her needs in a mobile context. Network based applications may thus be developed to take advantage of such soft and/or hard client capabilities. Virtual Private Networks (VPNs) and remote desktop capabilities, for example, have been developed in the context of data access.

As used herein, the term "persona" (also referred to as a "profile") is defined as a collection of data and/or behavior characteristics that encompass a particular mode of operation chosen and defined by a user. For example, a user may have a "work profile" and a "home profile". A work profile may include, for example, capabilities and/or data associated with the user's work phone. Such data and/or capabilities may include (but are not limited to) a call history, an address book, speed dialing codes, a forwarding number, billing arrangements, voicemail, and the like Similar data and/or capabilities may be provided for a user's home profile. The user may have any number of profiles, such as, a vacation profile, a community profile, a home profile, a work profile, and the like.

According to some embodiments, a user having multiple personas (profiles) may change the current persona of an internet protocol (IP) multimedia subsystem (IMS) using a plain old telephone service (POTS) keypad or non-IMS, non-session initiation protocol (SIP) telephone without having access a web based interface which allows subscribers (users) to manage and personalize their service. In particular, as discussed further herein, IMS is based on IP for transport and uses SIP as the signaling protocol. With IMS, as with voice over IP (VoIP), a web-based interface can be used by subscribers to manage and personalize their service. IMS includes the concept of personas that, as discussed above, are collections of data and/or behavior characteristics that encompass a particular mode of operation chosen and defined by a user. For example, personas may include employee, family member, social club member and the like. Within IMS a persona may be invoked using an IMS-capable terminal or a web interface. However, sometimes a user does not have access to an IMS capable terminal or a web interface. Accordingly, some embodiments discussed herein with respect to FIGS. 1 through 4, provide methods, systems and computer program products for invoking a persona from a non-IMS, non-SIP phone, such as a POTS telephone, to an IMS using the conventional telephone keypad.

Figure 1:
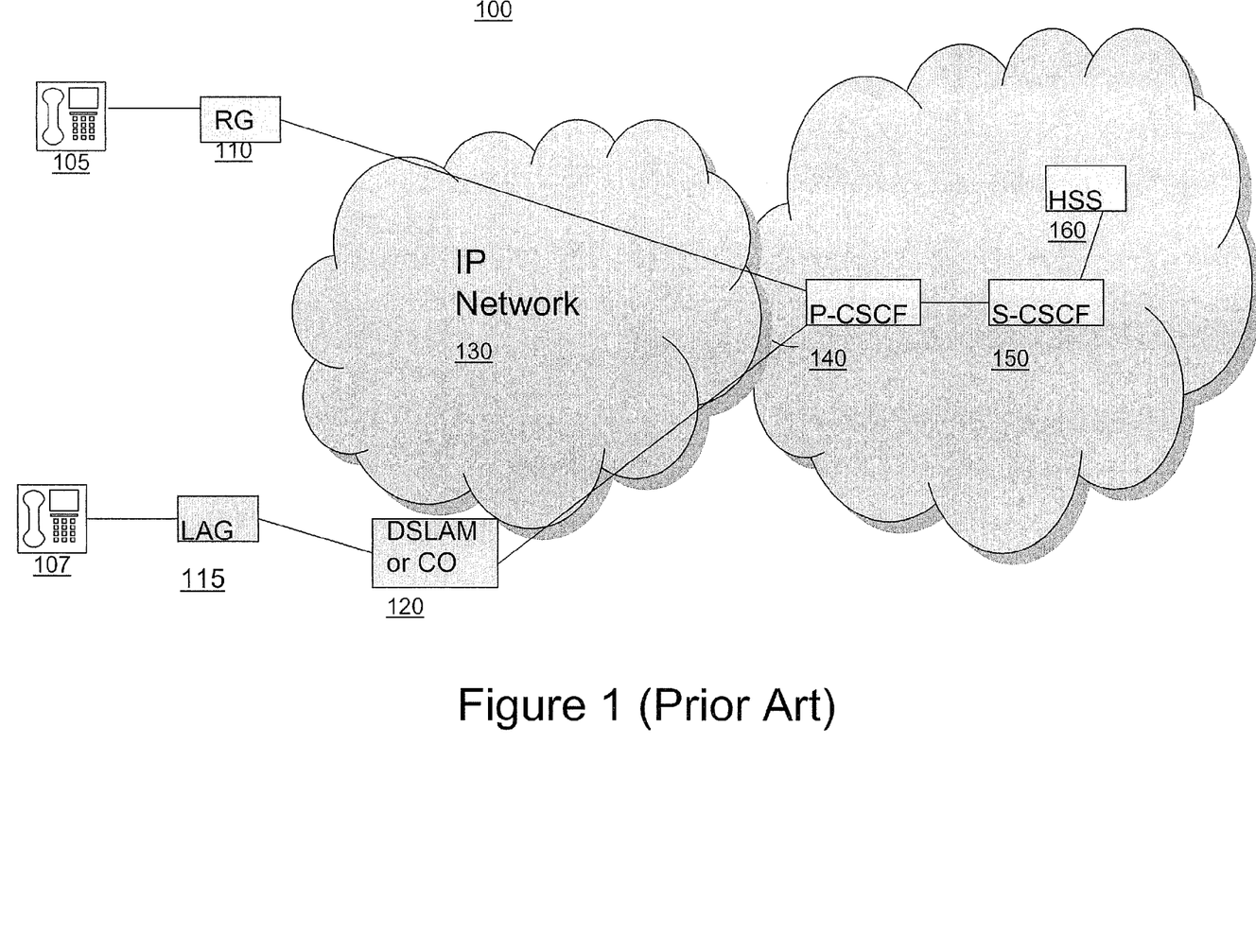
FIG. 1 is a block diagram of a conventional data processing system.

Referring first to FIG. 1, example conventional operations using a conventional telephone will be discussed with respect to the system of FIG. 1. In other words, operations will be discussed with respect to systems that do not include a persona module in accordance with some embodiments discussed in the present application. As illustrated in FIG. 1, the system 100 includes one or more POTS telephones 105, 107, a line access gateway (LAG) 115 coupled to a digital subscriber line access multiplexer (DSLAM) or a central office (CO) 120, a residential gateway (RG) 110, an internet protocol (IP) network 130 that includes a proxy call session control function (P-CSCF) 140, a serving CSCF (S-CSCF) 150 and a home subscriber server (HSS) 160.

As further illustrated in FIG. 1, the POTS telephones 105, 107 are connected to the IP network 130 through the RG 110 or the LAG 115/DSLAM 120. Thus, an end user of one of the POTS telephones 105, 107 dials a sequence of digits using the keypad of the POTS telephone 105, 107. The RG/LAG 110/115 provides the dialed sequence of digits in a SIP message, the resulting message is referred to herein as the "SIP INVITE." The end user's number is referred to herein as the end user's "Tel URI" (IMS terminology). The end user's Tel URI is included in a P-preferred identity field of the SIP INVITE. The SIP INVITE includes the end user's Tel URI in the P-preferred identity field is provided to the P-CSCF 140 when the signaling encounters the IMS.

The P-CSCF 140 is configured to ensure the SIP INVITE is from an authenticated party, the proper security associations are in place, and that the requested identity is permissible/allowable, for example, not barred. If the SIP INVITE is authenticated, the P-CSCF 140 changes the status of the field from P-preferred-identity to a P-asserted identity having the end user's same Tel URI as contents of that field. The contents of the P-asserted-identity field can be thought of as a "persona," since the p-asserted identity field maps to a particular set of user-subscribed features and services. The P-asserted identity is provided to the S-CSCF 150. Responsive thereto, the S-CSCF 150 is configured to download the end user's profile from the Home Subscriber Server (HSS 160). The S-CSCF 150 is further configured to selects the features and services set that maps to the P-asserted-identity. Thus, according to conventional methods, the end user has no way, using the POTS telephone, of changing the P-preferred-identity, since it is his/her originating line number. Therefore, effectively the end user has no way to change the persona currently associated with the Tel URI to another persona.

Figure 2:
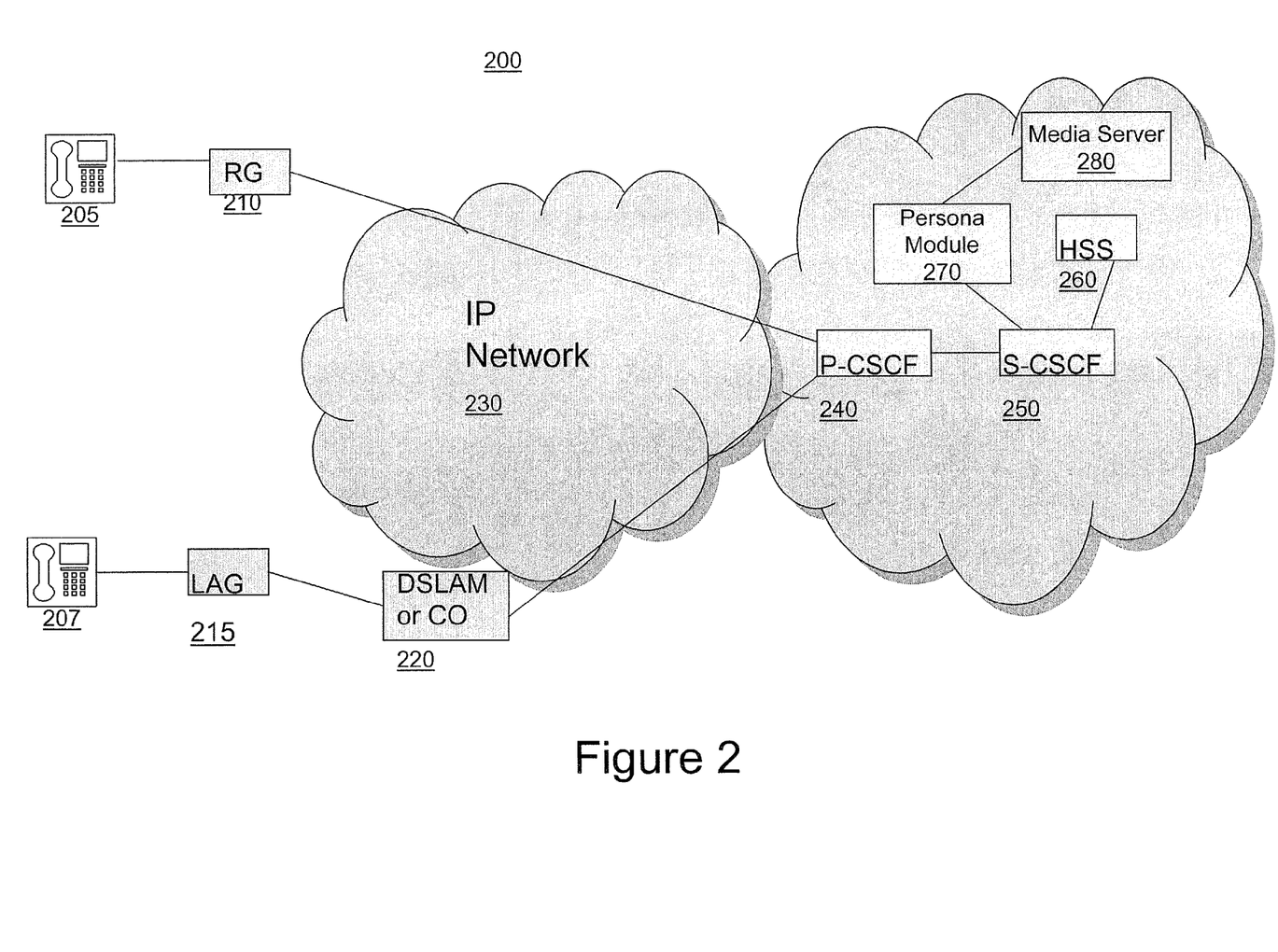
FIG. 2 is a block diagram of a system including a persona module according to some embodiments.

Referring now to FIG. 2, a system including a persona module in accordance with some embodiments will be discussed. As illustrated in FIG. 2, the system 200 includes one or more POTS telephones 205, 207, a LAG 215 coupled to a DSLAM or a CO 220, a RG 210, an IP network 230 that includes a P-CSCF 240, a S-CSCF 250, a HSS 260, a persona module 270 in accordance with some embodiments and a media server 280.

It will be in understood that in accordance with some embodiments, the non-SIP, non-IMS telephone (POTS telephone 205, 207) is connected to a LAG 215 at a DSLAM or a central office 220, or the non-SIP, non-IMS telephone is connected to an RG 210 on the customer's premises (CPE). The LAG 215 or RG 210 converts the voice stream to IP packets and provides any dialed digits in SIP messages. Furthermore, for purposes of the example discussions herein, it may be assumed that the end user has already been authenticated and registered to the IMS for service.

Referring again to FIG. 2, as discussed above, the POTS telephones 205, 207 are connected to the IP network 230 through the RG 210 or the LAG 215/DSLAM 220. The end user of one of the POTS telephones 205, 207 dials a sequence of digits, for example, "*XX+N" where X represents the digits 0 to 9 on a keypad of the POTS telephone 205, 207. As used herein, N may also represent the digits 0-9, but may have a separate function as will be discussed further herein. It will be understood that only example embodiments are discussed herein and, therefore, embodiments are not limited by these examples. For example, any number of digits may be used to indicate that a change of persona is to be made in accordance with embodiments discussed herein. The RG/LAG 210/215 provides the dialed sequence of digits in a SIP INVITE. The end user's Tel URI is included in a P-preferred identity field of the SIP INVITE. The SIP INVITE including the end user's Tel URI in the P-preferred identity field is provided to the P-CSCF 240 when the signaling encounters the IMS.

As is understood by those having skill in the art, the P-CSCF 240 is an IMS element that identifies the mobiles first contact point within the IP multimedia core network (IMCN) subsystem. Functions of the P-CSCF 240 include the forwarding of SIP messages received from the UE. The SIP messages may be sent to S-CSCF 250 as discussed herein, depending on the type of message and procedure being carried out. The P-CSCF 240 may also be responsible for the generation of call detail record (CDR).

The P-CSCF 240 is configured to ensure the SIP invite is from an authenticated party, the proper security associations are in place, and that the requested identity is permissible/allowable, for example, not barred. If the SIP INVITE is authenticated, the P-CSCF 240 changes the status of the field from P-preferred-identity to a P-asserted-identity having the end user's same Tel URI as contents of that field. The contents of the P-asserted-identity field can be thought of as a "persona," since the p-asserted identity field maps to a particular set of user-subscribed features and services. The P-asserted identity is provided to the S-CSCF 250.

As is understood by those having skill in the art, the S-CSCF 250 provides session control for subscribers accessing services within the IMCN. In essence the S-CSCF 250 is a SIP Server. It has responsibility for interacting with network databases such as the HSS 260 for mobility and Access, Authorization and Accounting (AAA) Servers, for example, media server 280, for security. As part of the SIP Registration process a user may be allocated a S-CSCF 250 that will reside in the subscribers HPLMN and be responsible for all aspects of session control Referring again to FIG. 2, the S-CSCF 250, in accordance with some embodiments, is configured to recognize the "*XX+N" format in the SIP INVITE and determine that these dialed digits are to be handled by the Persona Module 270, for example, an application server, in accordance with some embodiments of the present invention. The persona module 270 is configured to examine the dialed digits and map the dialed digits ("*XX+N") to a persona associated with a particular P-asserted identity. The persona module 270 is further configured to send a message back to the S-CSCF 250 indicating that the S-CSCF 250 should use the P-asserted identity determined by the persona module 270 (referred to herein as the "selected persona"), not the "original persona" identified by the Tel URI.

The S-CSCF 250 changes the P-asserted-identity contents to the selected persona indicated by the persona module 270. The S-CSCF 250 is configured to download the end user's profile from the HSS 260. The S-CSCF 250 is further configured to select the features and services set that maps to the selected persona now in the P-asserted-identity. The S-CSCF 250 is configured to inform the P-CSCF 240 of the selected persona and that the P-CSCF 240 should use the selected persona until further notice for the telephone line to which the POTS telephone 205, 207 is connected. It will be understood that in accordance with some embodiments, the selected persona (new P-Asserted Identity) may be associated with a persona that resides in the end user's profile and could take the format of either a SIP URI (email address) or a Tel URI (telephone number) without departing from the scope of the teachings of the present application.

As discussed above, the P-CSCF 240 is instructed to use the persona until further notice. In some embodiments, "until further notice" could be flexible and mean until the next call request, until another persona is requested, for the rest of today or the like. In certain embodiments, these different meanings could be specified in the sequence of digits X and N dialed using the keypad of the telephone 205, 207. For example, if the end user dials *234 on the telephone keypad, the *23 could be the feature code for—change my persona— and the following 4 could mean—change my persona to Mom. In these embodiments, until further notice could be uniform for all callers and the new persona may stay in effect until explicitly changed by the end user (subscriber). In further embodiments, *23 could mean—change my persona to Mom—and the following 4 may mean—use this persona on the following call only. Thus, it will be understood that the sequence of digits as well as what they mean are customizable and, therefore, the service provider has flexibility in how to provision the service. Accordingly, embodiments are not limited by the examples discussed herein.

For example, in some embodiments, the digits N could map to a persona as follows:

2=Employee or Business Persona;
4=Family Persona, for example, parent, mom, dad and the like; and
5=Social Persona, for example, president of local Supporters of the Arts club. Furthermore, in some embodiments, the * code could be used as follows:
*99=change the Persona (in the P-Asserted-Identity field) for the rest of today
*98=change the Persona (in the P-Asserted-Identity field) for this call (would only apply to outgoing calls)
*97=change the Persona (in the P-Asserted-Identity field) until the end user overrides with another Persona.

To summarize embodiments discussed above, it will be understood that the persona module 270 is configured to recognize the sequence of digits dialed (*XX+N), map the sequence of digits to a persona, and send this information back to the S-CSCF 250. The S-CSCF 250 is configured to recognize that the sequence of digits (*XX+N) has been dialed and route the SIP INVITE to the persona module 270. The S-CSCF 250 may also be configured to act on instructions from the persona module 270 including changing the content of the P-asserted identity field. The S-CSCF 250 is also configured to signal to the P-CSCF 240 of the change in P-asserted identity to the selected persona as discussed above. The P-CSCF 240 is configured to act on instructions from the S-CSCF 250 to change the P-asserted identity field.

It will be understood that some embodiments include some level of authentication to reduce the likelihood of misuse or mischief. For example, the end user may enter a personal identification number (PIN) before the sequence of digits (*XX+N) is acted upon. The PIN may be entered at any time without departing from the scope of the present application. For example, the persona module 270 may be configured to request entry of the PIN before acting on the dialed *XX+N. An announcement could be played and digits collected for the PIN. In embodiments including this announcement and digit capture capabilities, the persona module 270 may be configured to communicate with the media server 280 as illustrated in FIG. 2.

It will be understood that embodiments are not limited to outgoing calls. For example, for Incoming Calls, the scenario discussed above may be different because the end user is using a persona not associated with the default persona associated with that Tel URI. Consider in a work from home situation. The end user is at his home phone (770 555 1234) but is using a persona associated with his work Persona that has a SIP URI (email address) of Lorainethesalesrep@xyz and a Tel URI of 404 555 8765. A caller calling the home phone number 770 555 1234 is calling a home telephone number, not a number typically associated with a business address. These calls can be routed as normal.

A caller using an IMS-enabled terminal may use a SIP URI Lorainethesalesrep@xyz or a Tel URI in the destination field (Request-URI). If the caller uses the SIP URI, the terminating S-CSCF should, when it uses the initial Filter Criteria (iFC), find this address among the destination addresses. That is, this Request URI, after undergoing filtering by the iFC should map to a Persona (Work Persona) that indicates this Persona is currently located at the home Tel URI 770 555 1234 (along with possibly other addresses, including voice mail).

A caller using an IMS-enabled terminal may use a Tel URI (404 555 8765). In this case as well, the terminating S-CSCF should find this address among the destination addresses after applying the initial Filter Criteria (iFC). The Request URI (now a Tel URI), after undergoing filtering by the iFC should map to a Persona currently located at 770 555 1234 (along with possibly other addressees, including voice mail).

Figure 3:
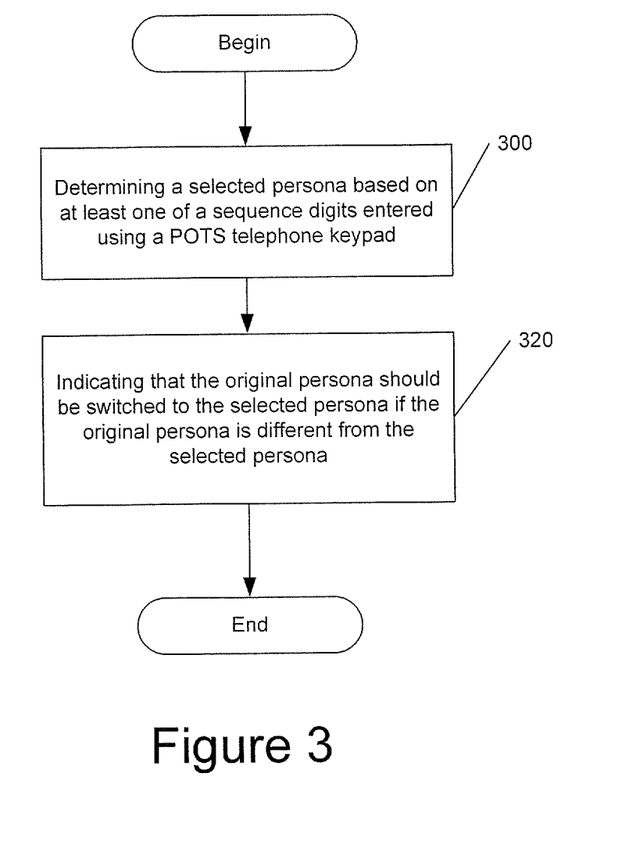
FIGS. 3 and 4 are flowcharts illustrating operations according to various embodiments.

Methods for switching personas using a keypad of a non-SIP, non-IMS telephone will now be discussed with respect to the flowcharts of FIGS. 3 and 4. Referring first to FIG. 3, operations for switching personas associated with an asserted identity using a keypad of a POTS telephone begin at block 300 by determining a selected persona based on at least one of a sequence of digits entered during initiation of a call using the POTS telephone keypad. For example, the "*XX+N"

sequence discussed above with respect to FIG. 2. The at least one of the sequence of digits indicates a request for a persona associated with an asserted identity. In some embodiments, the sequence of digits entered during initiation of the call may include an indication of how long the selected persona should be used, for example, use the selected persona for the remainder of the present day, use the selected persona for this call only or use the selected persona until further notice. In some embodiments, an authentication code entered using the keypad of the POTS telephone may be processed before the sequence of digits is acted upon.

It is indicated that an original persona associated with the asserted identity should be switched to the selected persona associated with the asserted identity if it is determined that the original persona and the selected persona are different (block 320). It will be understood that a user associated with the asserted identity has been authenticated to and registered with an IMS service. The POTS telephone may be a non-IMS, non-SIP telephone.

Figure 4:
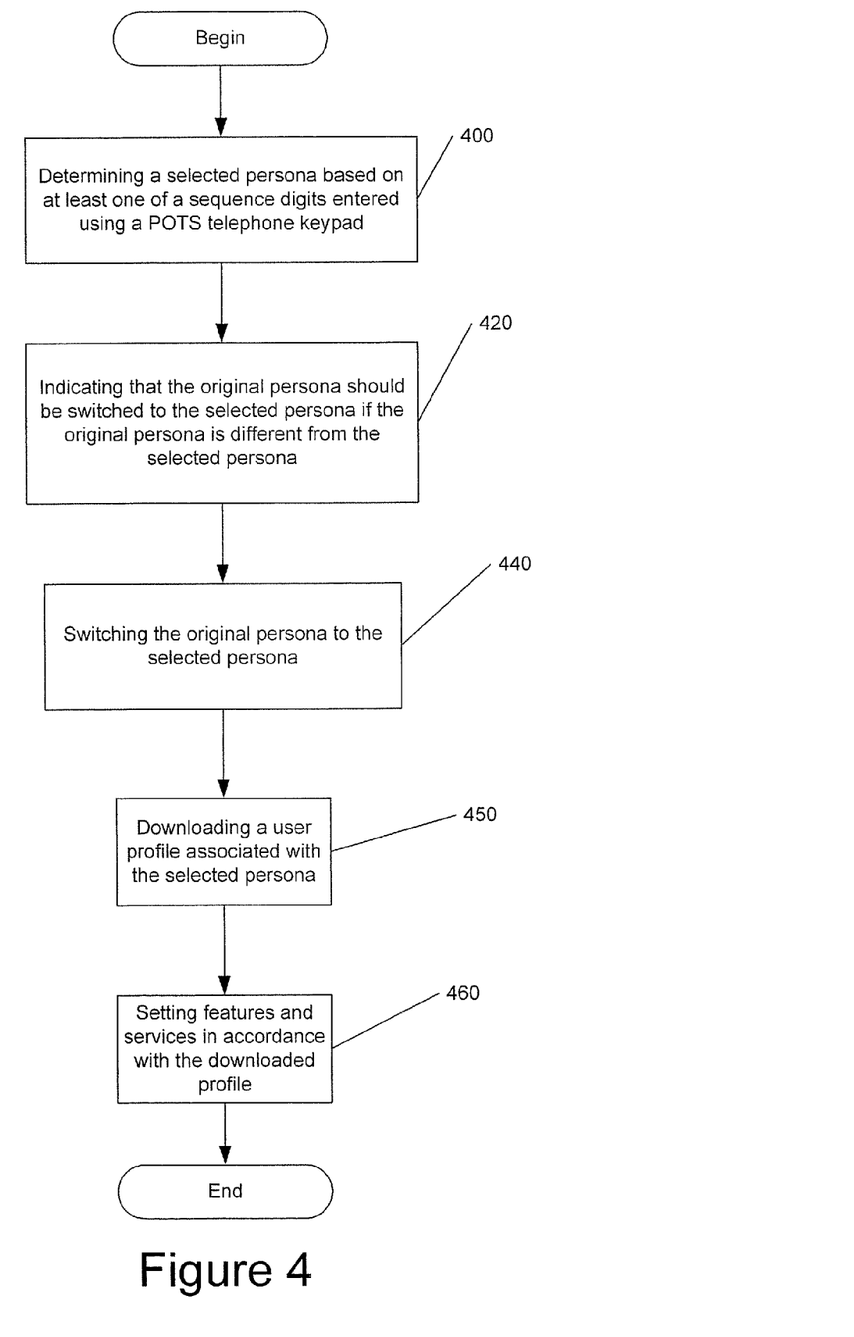

Referring now to FIG. 4, operations for switching personas associated with an asserted identity using a keypad of a POTS telephone at block 400 by determining a selected persona based on at least one of a sequence of digits entered during initiation of a call using the POTS telephone keypad. For example, the "*XX+N" sequence discussed above with respect to FIG. 2. The at least one of the sequence of digits indicates a request for a persona associated with an asserted identity. It is indicated that an original persona associated with the asserted identity should be switched to the selected persona associated with the asserted identity if it is determined that the original persona and the selected persona are different (block 420).

The original persona may be switched to the selected persona if it is determined that the original and the selected persona are different (block 440). A user profile associated with the selected persona may be downloaded (block 450). Features and services for the call may be set in accordance with the downloaded profile (block 460).

In the drawings and specification, there have been disclosed embodiments and, although specific terms are employed, they are used in a generic and descriptive sense only and not for purposes of limitation, the scope of the present application being set forth in the following claims.

That which is claimed is:

1. A method of switching personas associated with an asserted identity, comprising:
    determining a selected persona based on at least one of a sequence of digits entered during initiation of a call using a plain old telephone service keypad, the at least one of the sequence of digits indicating a request for a persona associated with an asserted identity; and
    indicating that an original persona associated with the asserted identity should be switched to the selected persona associated with the asserted identity if it is determined that the original persona and the selected persona are different,
    wherein the sequence of digits entered during initiation of the call further includes an indication of how long the selected persona should be used;
    wherein the indication comprises one of use the selected persona for the remainder of the present day and use the selected persona for this call only; and
    wherein the determining and the indicating are performed by at least one processor.

2. The method of claim 1, further comprising:
    switching the original persona to the selected persona if it is determined that the original and the selected persona are different;
    downloading a user profile associated with the selected persona; and
    setting features and services for the call in accordance with the user profile.

3. The method of claim 1, wherein determining further comprises processing an authentication code entered before the sequence of digits.

4. The method of claim 1, wherein a user associated with the asserted identity has been authenticated to and registered with an internet protocol multimedia subsystem service.

5. The method of claim 1, wherein the method is performed using a plain old telephone service telephone comprising a non-internet protocol multimedia Subsystem, non-session initiation protocol telephone.

6. A system for switching personas associated with an asserted identity, comprising:
    a persona module included in at least one processor and configured to:
    determine a selected persona based on at least one of a sequence of digits entered during initiation of a call using a plain old telephone service keypad, the at least one of the sequence of digits indicating a request for a persona associated with an asserted identity; and
    indicate that an original persona associated with the asserted identity should be switched to the selected persona associated with the asserted identity if it is determined that the original persona and the selected persona are different,
    wherein the sequence of digits further includes an indication of how long the selected persona should be used and
    wherein the indication comprises one of use the selected persona for the remainder of the present day and use the selected persona for this call only.

7. The system of claim 6, further comprising a
    a serving call session control function configured to switch the original persona to the selected persona if the original and the selected persona are determined to be different, download a user profile associated with the selected persona and set features and services for the call in accordance with the user profile.

8. The system of claim 6, wherein the persona module is further configured to authenticate the user using an authentication code entered before the sequence of digits.

9. The system of claim 6, wherein the sequence of digits is entered using a plain old telephone service telephone and wherein the plain old telephone service telephone comprises a non-internet protocol multimedia Subsystem, non-session initiation protocol telephone, the system further comprising
    a line access gateway and/or a residential gateway connected to the plain old telephone service telephone that is configured to convert voice stream to internet protocol packets and provide the sequence of digits entered using the plain old telephone service telephone keypad in a session initiation protocol message.

10. A computer program product for switching personas associated with an asserted identity, the computer program product comprising:
    a non-transitory computer-readable storage medium having computer-readable program code embodied in said medium, said computer-readable program code being executed by at least one processor and comprising:
    computer readable program code configured to determine a selected persona based on at least one of a sequence of digits entered during initiation of a call using a plain old telephone service keypad, the at least one of the sequence of digits indicating a request for a persona associated with an asserted identity; and computer readable program code configured to indicate that an original persona associated with the asserted identity should be switched to the selected persona associated with the asserted identity if it is determined that the original persona and the selected persona are different, wherein the sequence of digits entered during initiation of the call further includes an indication of how long the selected persona should be used and wherein the indication comprises one of use the selected persona for the remainder of the present day and use the selected persona for this call only.

11. The computer program product of claim 10, further comprising:

computer readable program code configured to switch the original persona to the selected persona if it is determined that the original and the selected persona are different;

computer readable program code configured to download a user profile associated with the selected persona; and computer readable program code configured to set features and services for the call in accordance with the user profile.

12. The computer program product of claim 10, wherein the computer readable program code configured to determine further comprises computer readable program code configured to authenticate an authentication code before the sequence of digits.

13. The computer program product of claim 10, wherein a user associated with the asserted identity has been authenticated to and registered with an internet protocol multimedia subsystem service.

14. The computer program product of claim 10, wherein the sequence of digits are entered using a plain old telephone service telephone and wherein the plain old telephone service telephone comprises a non-internet protocol multimedia Subsystem, non-session initiation protocol telephone.

* * * * *

UNITED STATES PATENT AND TRADEMARK OFFICE
CERTIFICATE OF CORRECTION

| | | |
|---|---|---|
| PATENT NO. | : 8,654,949 B2 | Page 1 of 1 |
| APPLICATION NO. | : 11/970127 | |
| DATED | : February 18, 2014 | |
| INVENTOR(S) | : Beyer et al. | |

It is certified that error appears in the above-identified patent and that said Letters Patent is hereby corrected as shown below:

In the Claims:
Column 10, Claim 6, Line 34: Please correct "be used and"
                                                         to read -- be used; and --

Column 11, Claim 10, Line 13: Please correct "be used and"
                                                         to read -- be used; and --

Signed and Sealed this
Fifth Day of August, 2014

Michelle K. Lee
*Deputy Director of the United States Patent and Trademark Office*